US006879556B2

(12) United States Patent
Thomas, III (10) Patent No.: US 6,879,556 B2
(45) Date of Patent: Apr. 12, 2005

(54) METHOD AND APPARATUS FOR OPTICAL DATA STORAGE

(75) Inventor: Fred C. Thomas, III, Ogden, UT (US)

(73) Assignee: Iomega Corporation, San Diego, CA (US)

(*) Notice: Subject to any disclaimer, the term of this patent is extended or adjusted under 35 U.S.C. 154(b) by 419 days.

(21) Appl. No.: 10/076,016

(22) Filed: Feb. 12, 2002

(65) Prior Publication Data

US 2003/0151998 A1 Aug. 14, 2003

(51) Int. Cl.[7] .............................................. G11B 7/00
(52) U.S. Cl. ................ 369/275.1; 369/53.1; 369/59.25; 369/47.1
(58) Field of Search ............................ 369/47.1, 47.46, 369/53.1, 53.19, 59.1, 59.25, 275.1, 275.2, 275.3, 275.4, 272, 112.01

(56) References Cited

U.S. PATENT DOCUMENTS 5,493,545 A * 2/1996 Matsumoto .............. 369/13.46
5,875,170 A * 2/1999 Tompkin et al. ......... 369/275.1

OTHER PUBLICATIONS

Howe, Dennis G., "RLL Modulation for Multi–level Recording", Optical Sciences Center, University of Arizona, Tucson, Arizona, Jul. 20, 1999, pp. 1–14.

Spielman, S., et al. "Using pit–depth modulation to increase capacity and data transfer rate in optical discs", Calimetrics, Inc., Alameda, California, date unknown, 10 sheets.

Wong, Terrence L., et al., "Multilevel Optical Recording", Calimetrics, Inc., Alameda, California, date unknown, 10 sheets.

* cited by examiner

*Primary Examiner*—Muhammad Edun
(74) *Attorney, Agent, or Firm*—James T. Hagler (57) ABSTRACT

An optical disk (10) includes several tracks (21–23, 121–125) that each include a series of optical data elements (29, 39). Each optical data element includes several reflective surfaces (31–34, 41–44) with respective different orientations that represent stored information. A detection system (210) directs a beam from a laser (217) onto successive optical data elements. The multiple reflective surfaces of each optical data element produce multiple reflected sub-beams that are imaged onto respective portions of a detector (219, 501, 541). The position of each sub-beam on the corresponding portion of the detector is determined, to thereby identify the orientation of the corresponding reflective surface and thus the stored information represented by that surface.

56 Claims, 7 Drawing Sheets

| A1 | A2 | B1 | B2 |
|----|----|----|----|
| A3 | A4 | B3 | B4 |

| C1 | C2 | D1 | D2 |
|----|----|----|----|
| C3 | C4 | D3 | D4 |

| A1 | A2 | A3 | A4 | B1 | B2 | B3 | B4 |
|----|----|----|----|----|----|----|----|
| A5 | A6 | A7 | A8 | B5 | B6 | B7 | B8 |
| A9 | A10 | A11 | A12 | B9 | B10 | B11 | B12 |
| A13 | A14 | A15 | A16 | B13 | B14 | B15 | B16 |
| C1 | C2 | C3 | C4 | D1 | D2 | D3 | D4 |
| C5 | C6 | C7 | C8 | D5 | D6 | D7 | D8 |
| C9 | C10 | C11 | C12 | D9 | D10 | D11 | D12 |
| C13 | C14 | C15 | C16 | D13 | D14 | D15 | D16 |

*FIG. 12*

METHOD AND APPARATUS FOR OPTICAL DATA STORAGE

TECHNICAL FIELD OF THE INVENTION

This invention relates in general to data storage techniques and, more particularly, to techniques for optically storing and retrieving data.

BACKGROUND OF THE INVENTION

Over the past twenty years, computer technology has evolved very rapidly. One aspect of this evolution has been a progressively growing demand for increased storage capacity in memory devices, especially where the information storage medium is some form of removable component. In this regard, just a little over a decade ago, the typical personal computer had a floppy disk drive which accepted floppy disk cartridges that contained a 5.25" disk with a storage capacity up to about 720 kilobytes (KB) per cartridge. Not long thereafter, these devices gave way to a new generation of floppy disk drives which accepted smaller floppy disk cartridges that contained a 3.5" disk with higher storage capacities, up to about 1.44 MB per cartridge.

Subsequently, as the evolution continued, a further significant increase in storage capacity was realized in the industry by the introduction of the removable optical disk. One such optical disk is commonly known as a compact disk (CD). Even more recently, a further type of optical disk was introduced, and is commonly known as a Digital Versatile Disk (DVD).

The compact disk has an information storage surface with a plurality of tracks that each have therealong a series of optical data pits of variable length. This variable pit length recording is termed run-length-limited (RLL) encoding. By using RLL, present optical data storage products (CD and DVD) are able to encode information onto an optical media with pit lengths shorter than the spot size of a laser stylus used for recording and reading data in these products. In order is used. This rule set for present optical products (CD and DVD) converts data bits into recorded channel bits with a 1:2 efficiency. That is, two optical media recorded channel bits are used to encode one data bit. This is thus part of the factors that define what size media area under present optical data storage standards can be considered to be a single bit optical data element. An optical data element hence is the area required for storage of one basic unit of information on the data storage media. For CD and DVD technologies, this basic unit is one bit ("1" or "0") of data. For example, with the requirements of RLL overhead factored in, the size of a CD optical data element storing one bit of user data has a size of about 1.6 microns by 0.56 microns.

The DVD disk has either one or two layers of information storage surfaces, only one of which is read or written at any given point in time. Each information storage surface includes a plurality of tracks that, like a compact disk, each have therealong a series of optical data elements reduced in size and configuration from that of the optical data elements of a compact disk. In particular, for each optical data element, which represents a user single binary bit which is a binary "0" or "1", the user optical data element size is reduced to about 0.74 microns by 0.26 microns. The similarity between the formats from the optical data element size perspective is that the approximate ratio in the dimensions is 3:1. The larger of the two dimensions is the data track pitch in both the CD and DVD case.

Although these pre-existing optical disks have been generally adequate for their intended purposes, there is still a progressively growing demand for increased storage capacity in optical storage media. In addition, there is also a need for an increase in the rate at which information can be read from optical media. Also, to the extent that some form of higher capacity optical media is provided, it is desirable that it have a cost per unit which is in approximately the same range as the cost of existing compact disks or DVD disks. Further, to the extent that some such higher capacity optical media is provided, it is desirable that a detection system capable of reading it be compatible with pre-existing compact disks and/or DVD disks, while having a cost which is not significantly greater than that of existing detection systems used for existing disks.

SUMMARY OF THE INVENTION

From the foregoing, it may be appreciated that a need has arisen for a method and apparatus for storing data on and reading from an optical media with substantially higher storage capacities than exist with currently available optical media. The present invention addresses this need. According to a first form of the invention, a method and apparatus involve: providing an information storage media having a plurality of reflective portions; and configuring each reflective portion to have a selected one of a plurality of predetermined orientations that are different, the number of predetermined orientations being greater than two, and each predetermined orientation representing respective different stored information.

According to a different form of the invention, a method and apparatus involve: providing an information storage media having a plurality of reflective portions; configuring each reflective portion to impart to radiation reflected therefrom a selected one of a plurality of predetermined characteristics that are different, each predetermined characteristic representing different stored information; allocating the predetermined characteristics among a predetermined number of groups so that each predetermined characteristic belongs to only one of the groups, and so that each group contains more than two of the predetermined characteristics; organizing the reflective portions as a plurality of data elements which each include a plurality of the reflective portions equal in number to the number of groups; and configuring the reflective portions of each data element to have respective predetermined characteristics which each belong to a respective group.

According to yet another form of the invention, a method and apparatus involve: providing an information storage media having a plurality of reflective portions; configuring each reflective portion to impart to radiation reflected therefrom a selected one of a plurality of predetermined characteristics that are different; organizing the reflective portions as a plurality of data elements which each include a predetermined number of the reflective portions; directing a beam of radiation onto one of the data elements so that each of the reflective portions of that data element produces a respective reflected beam; directing each of the reflected beams from the illuminated data element onto a detector having a plurality of sections equal in number to the number of reflective portions in each data element, in a manner so that each reflected beam is directed onto a respective section of the detector; and determining the predetermined characteristic of each reflective portion of the data element illuminated by the beam in response to outputs from the sections of the detector.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
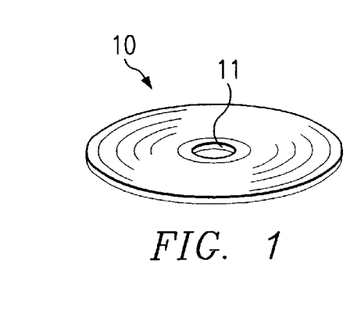
FIG. 1 is a diagrammatic perspective view of an optical disk which embodies aspects of the present invention.

FIG. 1 is a diagrammatic perspective view of an optical disk 10 which embodies aspects of the present invention, and which serves as an optical information storage media. The optical disk 10 can be referred to as an articulated optical read only memory (AO-ROM). The optical disk 10 is circular, and a circular central opening 11 extends concentrically through the center thereof.

Figure 2:
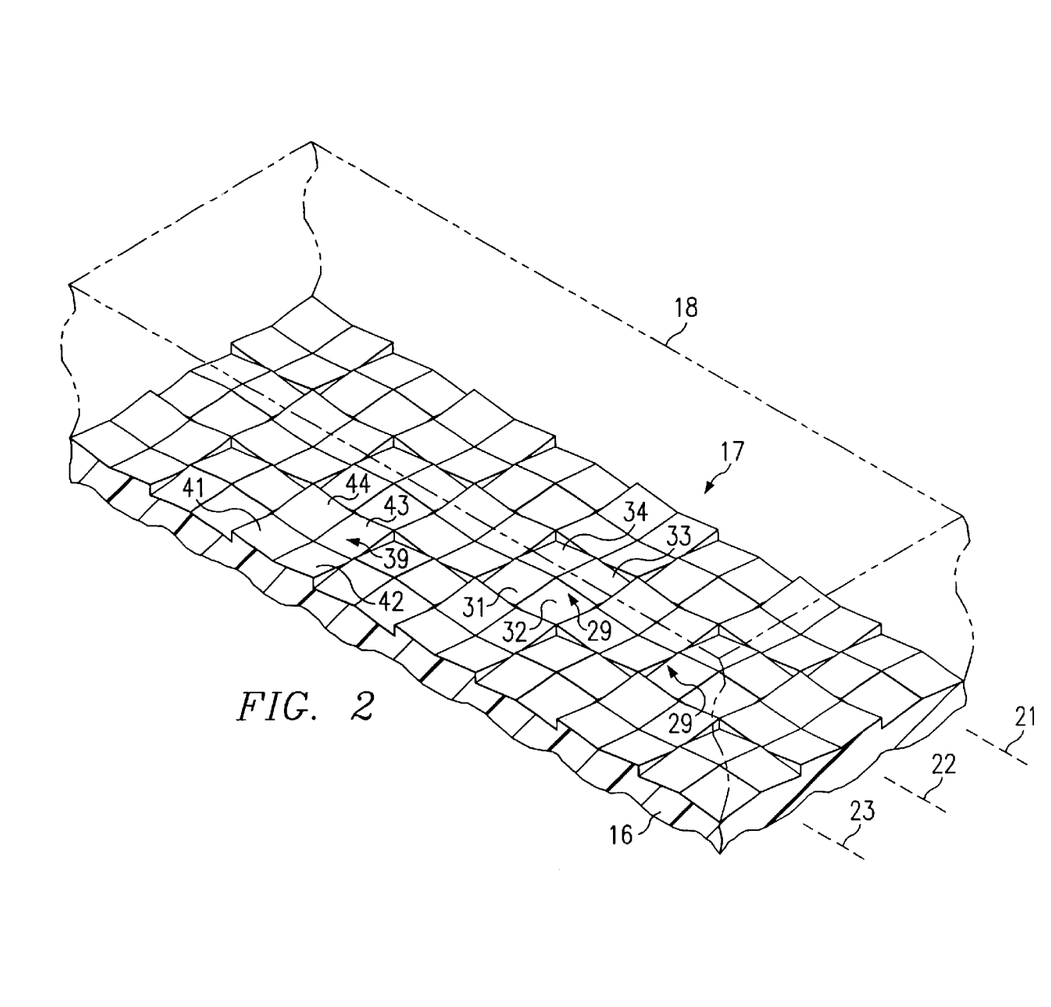
FIG. 2 is a diagrammatic fragmentary perspective view of a small portion of the disk of FIG. 1, with a cover layer thereof shown in broken lines for clarity.

FIG. 2 is a diagrammatic fragmentary perspective view of a small portion of the disk 10. The disk 10 includes a base layer 16 made of a plastic material, for example a polycarbonate material of the type used for the base layer in commercially available compact disks (CDs). However, the base layer 16 could alternatively be made from some other suitable material, such as a sol-gel glass material. The upper side of the base layer 16 is covered by a thin layer of a reflective metal, which is so thin that it is not separately shown in FIG. 2, and is treated herein as an integral part of the base layer 16. The metal layer is a type of material known to persons skilled in the art of compact disks, but could alternatively be any other suitable reflective material. The base layer 16 has, on the upper side of the thin metal layer, an upwardly facing surface 17. The surface 17 serves as an information storage surface, and has a three-dimensional topography which is discussed in more detail later.

A transparent cover layer 18 is provided over the surface 17 on the base layer 16, and in the embodiment of FIG. 1 is made from the same material as the base layer 16. The cover layer 18 serves as an isolation layer, which is functionally comparable to the isolation layer provided in a commercially available compact disk. In particular, normal use of the disk 10 may result in scratches in the top surface of the cover layer 18, and/or contamination such as fingerprints on this top surface. However, the presence of layer 18 serves to keep such damage and contamination spaced from the surface 17. Thus, when a laser beam is focused on the surface 17 in order to read data from it, the scratches and contamination will be spaced from the focal plane of the beam, and will thus be less likely to introduce errors into the information being read optically from the surface 17.

Turning in more detail to the surface 17, the disk 10 has information stored in a form of a plurality of concentric tracks, the centerlines of three adjacent tracks being indicated diagrammatically in FIG. 2 by respective broken lines 21, 22 and 23. The part of the disk shown in FIG. 2 is so small that the portions of the tracks 21-23 each appear to be linear in the drawings, but each such track is in fact arcuate. Although the embodiment under discussion has concentric tracks, it will be recognized that the disk 10 could alternatively have a single long spiral track, with portions which are adjacent and effectively concentric to each other.

Each of the tracks on the disk has a series of optical data elements (ODEs) provided along it, one of these ODEs being designated by reference numeral 29. The ODE 29 is located in the track 22. Each ODE is approximately square, and has four reflective surfaces or micromirrors which are each planar. The four reflective surfaces of the ODE 29 are respectively identified by reference numerals 31–34. Reference numeral 39 designates a further ODE, which is in track 23 and has four reflective surfaces 41-44.

The ODEs 29 and 39 each have a length and width of approximately 1.6 microns, for CD cross compatibility. In the drawings, each of the reflective surfaces 31-34 and 41-44 is depicted as being approximately square. However, persons skilled in the art will recognize, that if run-length-limited (RLL) encoding is utilized, the reflective surfaces will all have the same width, for example, but may have different lengths in the direction in which the track extends, in manner so that the overall length of the entire ODE in the direction of the track is always the same. Thus, for example, the reflective surfaces 31 and 34 might have lengths of 0.9 microns when the reflective surfaces have lengths of 0.7 microns. Alternatively, the reflective surfaces 31 and 34 might have lengths of 0.7 microns when the reflective surfaces have lengths of 0.9 microns. Or the reflective surfaces 31 and 34 might have lengths of 1.0 microns when the reflective surfaces have lengths of 0.6 microns. Similarly, the reflective surfaces 31 and 34 might have lengths of 0.6 microns when the reflective surfaces have lengths of 1.0 microns. It will be recognized that, by using RLL and varying the length dimension of the reflective surfaces, the duration of the reflection they each produce when passing the laser beam will be proportional to the length thereof. The duration of each such reflection can be detected, thereby permitting additional information to be encoded into each ODE.

In a commercially available Digital Versatile Disk (DVD), a comparable area of 0.74 microns by 0.74 microns is used for a single optical storage element, and for DVD cross compatibility the ODE 29 could alternatively have length and width dimensions of approximately 0.74 microns. The optical storage element 29 can be considered to be equal or equivalent in area to those described earlier for CDs and DVDs, when one includes a 3:1 RLL encoding method for the size of the individual mirrors within each ODE. Hence, in current CD and DVD optical data formats, an ODE represents the equivalent of a binary "0" or a binary "1", or in other words two levels of information. In contrast, and as discussed in more detail below, each ODE in the disk 10 of the invention can store almost 10 different levels. Stated differently, the disk 10 can store almost 100 trillion levels of information in the same surface area used to store two levels of information in a standard compact disk or DVD disk.

The optical data element 29 is square, has four individual micro-mirror elements, and has overall length and width dimensions equal to the track pitch dimension. This 3× increase in size of the optical data element in the invention is offset by a run-length-encoding of the individual down track size or length of the mirrors within the square optical data element. This is implemented in practice by having 3 optical data elements.

Figure 3:
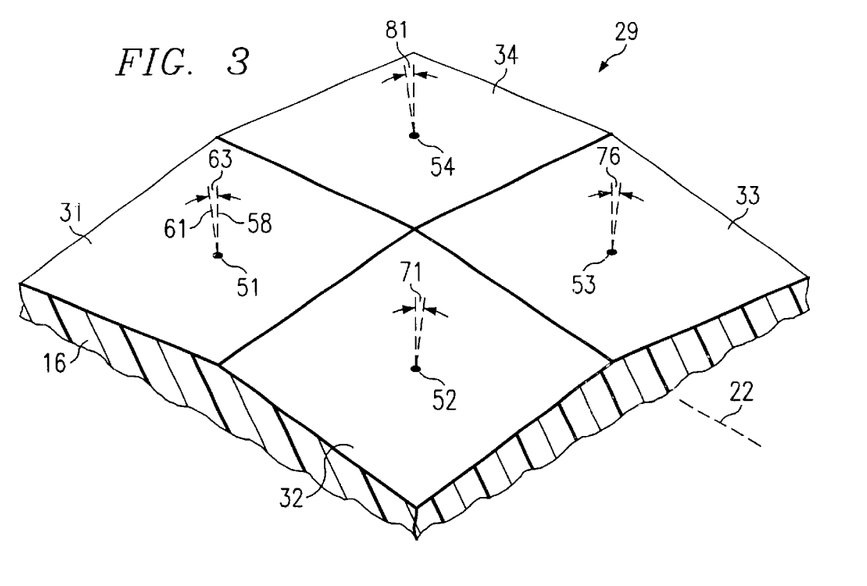
FIG. 3 is a diagrammatic fragmentary perspective view of one optical data element which is part of the disk of FIG. 1, with the cover layer of the disk omitted for clarity.
Figure 4:
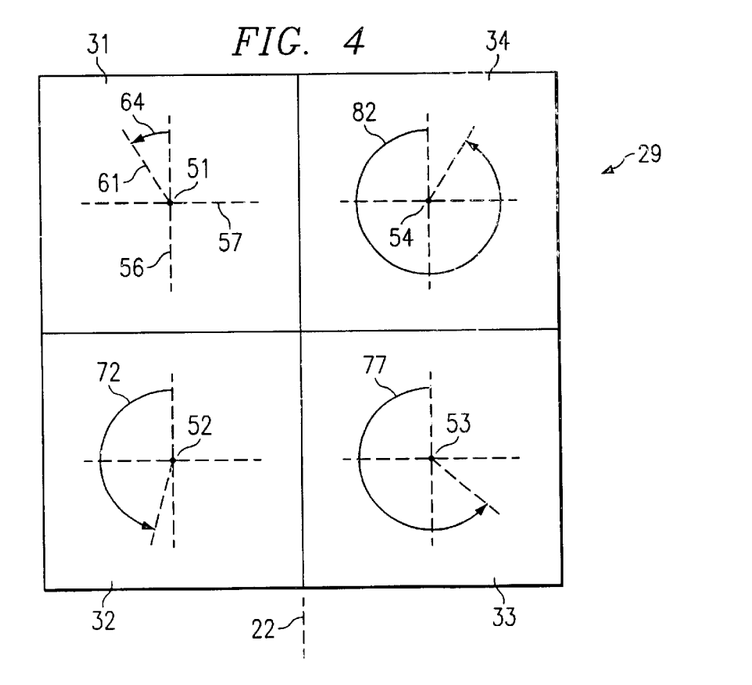
FIG. 4 is a diagrammatic fragmentary top view showing the optical data element of FIG. 3, with the cover layer of the disk omitted for clarity.

FIG. 3 is a diagrammatic fragmentary perspective view showing the ODE 29 of FIG. 2 in an enlarged scale, with the cover layer 18 of the disk omitted for clarity. FIG. 4 is a diagrammatic fragmentary top view showing the ODE 29, with the cover layer 18 omitted for clarity. As evident from FIG. 3, each of the four reflective surfaces 31–34 of the ODE 29 has a respective different orientation. The centerpoints of the four surfaces 31–34 are respectively indicated at 51–54. The centerpoints of all such reflective surfaces on the disk 10, including the centerpoints 51–54 of the surfaces 31–34, are disposed in a common imaginary plane, which extends parallel to the top and bottom surfaces of the disk 10 (FIG. 1).

Although the reflective surfaces on the disk 10 are fixed in position and do not move, it is easier to understand the orientation of each surface if each surface is viewed as though it could be pivoted about its centerpoint. With this in mind, the orientation of each reflective surface is defined in relation to three imaginary orthogonal axes which extend through its centerpoint. For example, with reference to FIGS. 3–4 and the surface 31, broken lines 56–58 represent three orthogonal axes which extend through the centerpoint 51 of the surface 31. The axes 56 and 57 each lie in the imaginary horizontal plane which contains the centerpoints of all of the reflective surfaces on the disk, with the axis 56 extending parallel to the adjacent segment of the centerline 22 for the track in which the reflective surface 31 is disposed, and the axis 57 extending perpendicular to the axis 56. The axis 58 extends vertically, and thus perpendicular to the plane which contains the centerpoints of all reflective surfaces.

In FIGS. 3 and 4, the broken line 61 represents an imaginary line which is perpendicular to the reflective surface 31. As shown in FIG. 3, the line 61 forms an angle 63 with respect to the vertical axis 58, and this angle 63 is called the tilt angle θ. As shown in FIG. 4, the line 61 is rotated about the vertical axis 58 that extends through the centerpoint 51 by an angle 64 with respect to the axis 56. The angle 64 is called the rotation angle α.

In the embodiment under discussion, the tilt angle 64 for the reflective surface 31 can vary from 1° to 22° in 1.5° increments, and thus can have any one of 15 different states. The rotation angle 64 can vary from 1.5° to 88.5° in 1.5° increments, or in other words can have any one of 59 different states. Thus, taking all possible combinations of both angles into account, the reflective surface 31 can have any one of 885 different orientations.

The orientation of the reflective surface 32 is defined in a similar manner by a tilt angle 71 (FIG. 3) and a rotation angle 72 (FIG. 4). The tilt angle 71 has the same range of possible values as the tilt angle 63, but the rotation angle 72 can vary from 91.5° to 178.5° in 1.5° increments, representing 59 possible states which are different. In a similar manner, the reflective surface 33 has a tilt angle 76 which can have the same range of values as the angles 63 and 71, and has a rotation angle 77 which can vary from 181.5° to 268.5° in 1.5° increments. Similarly, the reflective surface 34 has a tilt angle 81 which has the same range of values as each of the tilt angles 63, 71 and 76, and has a rotation angle 82 which can vary from 271.5° to 358.5° in 1.5° increments.

It will thus be recognized that each of the reflective surfaces 31–34 of the ODE 29 has a respective tilt angle, 63, 71, 76 or 81 which can vary in the same manner within a 22° range, but that each reflective surface has a rotation angle 64, 72, 77 or 82 which is in a respective different range or quadrant, such that one rotation angle is in the quadrant from 0° to 90°, another is in the quadrant from 90° to 180°, another is in the quadrant from 180° to 270°, and still another is in the quadrant from 270° to 360°. Each of the reflective surfaces 31–34 can thus have any one of 885 different orientations. Considering the four reflective surfaces 31–34 together, the number of different unique combinations of four surface orientations is $885^4$, or in other words approximately $6.134 \times 10^{11}$. As noted above, a standard compact disk or DVD disk would use the space occupied by ODE 29 to represent one of two levels, or in other words a binary "0" or a binary "1". In contrast, the ODE 29 can represent $6.134 \times 10^{11}$ different levels. It would take 40 binary bits to represent a number as large as $6.134 \times 10^{11}$. Thus, a standard compact disk or DVD disk would require nearly 40 times as much surface area as the ODE 29 in order to store the same amount of information which is stored in the ODE 29. Consequently, if the disk 10 of FIG. 1 had the same 120 mm diameter as a standard compact disk or DVD disk, it would be able to store almost 40 times as much information as either of those single layer formats, for example about 180 GB using the DVD-sized ODE (0.74 microns×0.74 microns). This assumes that the percentage of storage capability allocated to functions such as error correction and servo control in the disk 10 will be approximately the same as for existing compact disks and DVD disks.

As discussed above, the tilt angles 63, 71, 76 and 81 and the rotation angles 64, 72, 77 and 82 each vary increments in 1.5°. Alternatively, however, this increment value could be larger or smaller. For example, it could 0.5°, 3°, 5°, 10°, or some other value. It will be recognized that, as the increment value is changed, the number of possible orientations for each surface increases or decreases, which in turn increases or decreases the storage capacity of the disk. A further consideration is that the range of each tilt angle in the is approximately 22° in the embodiment under discussion, but it would be possible for this range to be larger or smaller, which in turn would increase or decrease the number of possible surface orientations and thus the amount of information that can be stored on the disk 10. Still another consideration is that the ODEs of the embodiment under discussion each have four reflective surfaces, but a larger or smaller number of reflective surfaces could be provided in each ODE without changing the basic size of each ODE. Also, by changing the length of reflective surfaces, various RLL encoding schemes maybe implemented, which in turn would proportionally increase or decrease the storage capacity of the disk 10.

It is worth noting that the change in storage capacity is not directly proportional to changes in the angle range or the increment value. As one example, if the increment value for each of the tilt and rotation angles was increased by a factor of more than six from 1.5° to 10°, the storage capacity of the disk 10 would decrease from approximately 40 times to approximately 17 times the capacity of a standard compact disk, representing a decrease in storage capacity which is only a little more than a factor of two.

Reflective surfaces on the disk 10 with a rotation angle between 0° and 90° are referred to herein as category "A" surfaces, reflective surfaces with a rotation angle between 90° and 180° are referred to herein as category "C" surfaces, reflective surfaces with a rotation angle between 180° and 270° are referred to herein as category "D" surfaces, and reflective surfaces with a rotation angle between 270° and 360° are referred to herein as category "B" surfaces. Thus, in FIG. 4, surface 31 is a category A surface, surface 32 is a category C surface, surface 33 is a category D surface, and surface 34 is a category B surface.

Figure 5:
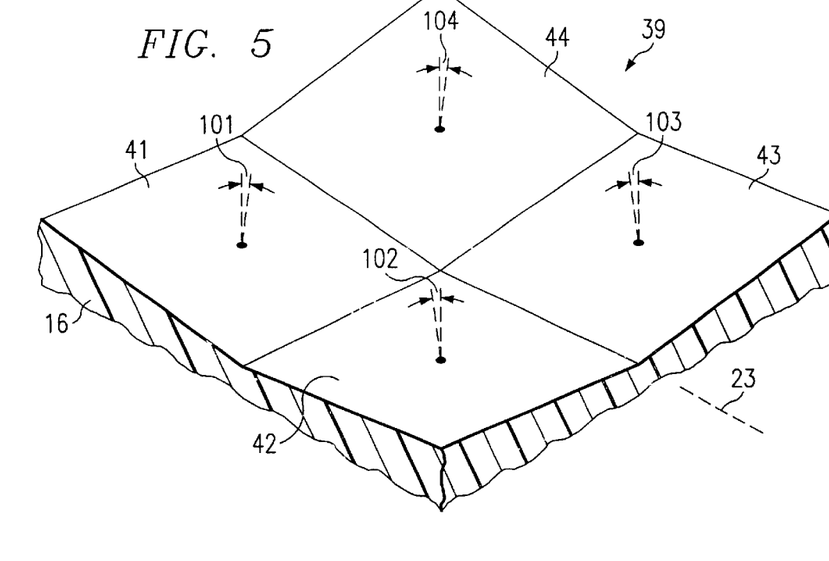
FIG. 5 is a diagrammatic fragmentary perspective view of a different optical data element which is part of the disk of FIG. 1, with the cover layer of the disk omitted for clarity.
Figure 6:
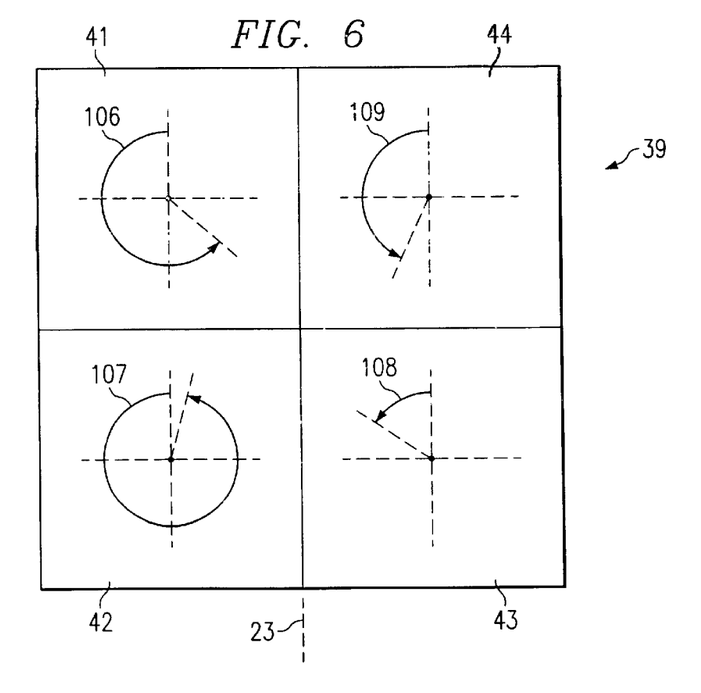
FIG. 6 is a diagrammatic fragmentary top view showing the optical data element of FIG. 5, with the cover layer of the disk omitted for clarity.

As evident from the foregoing discussion, each ODE has a respective surface from each of the four categories, and no ODE has two reflective surfaces from the same category. However, the surfaces from the various categories do not always have within the ODE the same relative positions which are shown in FIG. 4. In this regard, FIG. 5 is a diagrammatic perspective view of the ODE 39 of FIG. 2, and FIG. 6 is a diagrammatic fragmentary top view showing the ODE 29. In each of FIGS. 5–6, the cover layer 18 of the disk is omitted for clarity. As noted from FIGS. 5–6, the reflective surfaces 41–44 of the ODE 39 have respective tilt angles 101–104, and respective rotation angles 106–109. It will be noted from FIG. 6 that the reflective surface 43 has a rotation angle 108 between 0° and 90° and is thus the category A surface, the reflective surface 44 has a rotation 109 between 90° and 180° and is thus the category C surface, the reflective surface 41 has a rotation angle between 1800 and 2700 and is thus the category D surface, and the reflective surface 42 has a rotation angle 107 between 270° and 360° and is thus the category B surface. Consequently, the relative positions of the surfaces from the respective categories are different in the ODEs 29 and 39. Still other relative positions are possible.

Figure 7:
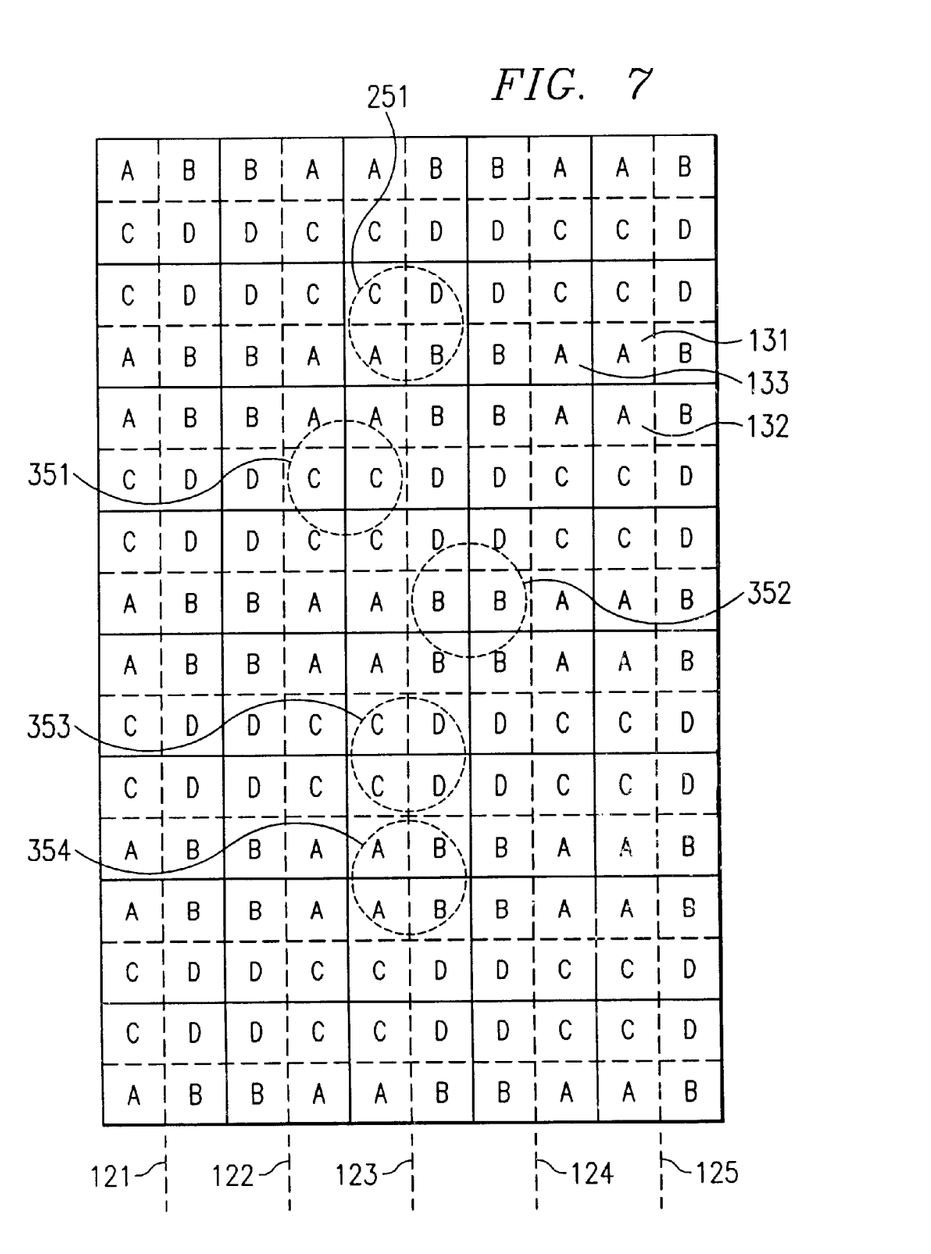
FIG. 7 is a diagrammatic fragmentary top view of a small portion of the disk of FIG. 1, with the cover layer of the disk omitted for clarity.

In this regard, FIG. 7 is a diagrammatic fragmentary top view of a small portion of the disk 10 of FIG. 1, with the cover layer 18 of the disk omitted for clarity. FIG. 7 shows sections of five adjacent tracks, identified by their respective centerlines 121–125. The ODEs in this view are separated from each other by solid lines, and the four reflective surfaces within each ODE are separated by broken lines. Further, each reflective surface has on it one of the letters A, B, C, and D, in order to designate the category to which it belongs, and thus the quadrant of its rotation angle.

It will be noted that, in this embodiment, every reflective surface is adjacent a reflective surface from the same category which is disposed in the adjacent ODE in the same track. Further, every reflective surface is adjacent a reflective surface from the same category which is disposed in the adjacent ODE in an adjacent track. For example, the reflective surface 131 from category A is adjacent a reflective surface 132 which is from category A and disposed in the adjacent ODE in the same track 125. Further, the reflective surface 131 from category A is adjacent a reflective surface 133 which is from category A and disposed in the adjacent ODE in the adjacent track 124. This use of this pattern of surfaces from the various categories facilitates servo tracking and other control functions, in a manner discussed in more detail later.

Figure 8:
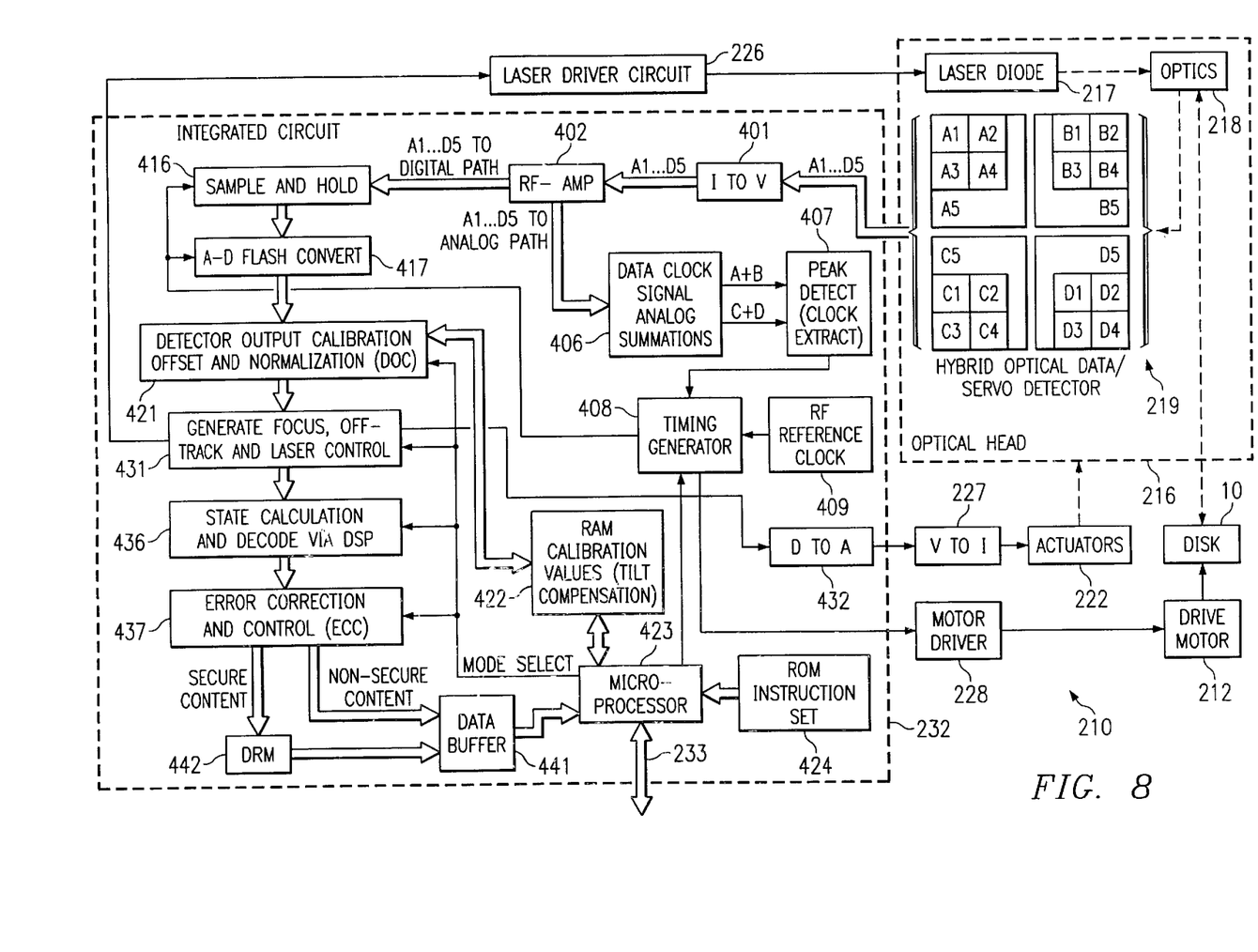
FIG. 8 is a block diagram showing the disk of FIG. 1 and also a detection system which is capable of reading information from the disk.

FIG. 10 is a block diagram showing the disk 10 of FIG. 1, and showing a detection system 210 which is capable of reading information from the disk 10. The disk 10 is removably disposed in the detection system 210. The detection system 210 is also capable of accepting and reading a standard compact disk, or a standard DVD disk.

The detection system 210 includes a drive motor 212, which can effect rotation of the disk 10 when the disk is removably received in the detection system 10. The detection system further includes an optical head 216, and the optical head 216 includes a laser diode 217, an optics system 218, and a detector 219. The laser diode 217 is a device of a known type, and in the embodiment under discussion produces light having a wavelength of 650 nm where the detection system 210 is capable of also reading a DVD disk, or a wavelength of 785 nm where the detection system 210 is capable of also reading a compact disk. The optics system 218, which is discussed in more detail later, directs a focused beam of laser light onto the surface 17 (FIG. 2) of the disk 10, and images the reflections from this beam onto the detector 219. The detector 219 is discussed in more detail later. Several voice coil actuators 220 are provided for the purpose of adjusting the position of the optical head 216 in relation to the disk 210, and for the purpose of adjusting the position of a lens component provided within the optics system 218, as discussed later.

The laser diode 217 is driven by a laser driver circuit 226, the actuators 222 are each driven by a respective portion of a voltage to current converter circuit 227, and the drive motor 212 is driven by a motor driver circuit 228. An integrated circuit 232, which is discussed in more detail later, accepts output signals from the detector 219, and uses this information to generate control signals for the laser driver circuit 226, the voltage to current conversion circuit 227, and the motor driver circuit 228. The detection system 210 operates as a peripheral to a not-illustrated host system such as a computer, and the integrated circuit 232 can communicate with the host system through a 32-bit bus 233.

Figure 9:
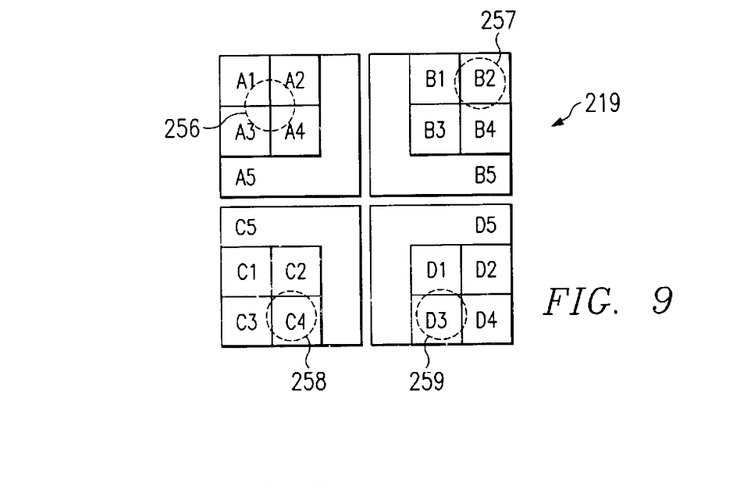
FIG. 9 is a diagrammatic view of a detector which is a component of the detection system of FIG. 8.

FIG. 9 is a diagrammatic view showing the detector 219 of FIG. 8 in an enlarged scale. The detector 219 has twenty separate detector elements A1–A5, B1–B5, C1–C5 and D1–D5. The detector 219 is approximately square, and has a 2×2 array of square sections or quadrants which each include a respective group of five detector elements. The upper left quadrant is the "A" quadrant, the upper right quadrant is the "B" quadrant, the lower left quadrant is the "C" quadrant, and the lower right quadrant is the "D" quadrant.

The upper left or "A" quadrant includes the five detector elements A1–A5. The detector element A5 is an L-shaped strip which has two legs respectively disposed next to the two adjacent quadrants, which are the B and C quadrants. The detector elements A1–A4 are each disposed on a side of the L-shaped detector element A5 remote from the other three quadrants. The detector elements A1–A4 are square detector elements, and are arranged in a 2×2 array which is a square. The five detector elements in each of the other three quadrants are arranged in a similar manner.

When the detector 219 is being used with a standard compact disk or DVD disk, the output signals from the five detector elements A1–A5 in quadrant A are summed with each other, the output signals from the five detector elements B1–B5 in quadrant B are summed with each other, the output signals from the five detector elements C1–C5 in quadrant C are summed with each other, the output signals from the five detector elements D1–D5 in quadrant D are summed with each other. Therefore, in this mode, the detector 219 operates like a pre-existing detector of the type used for standard compact disks and standard DVD disks, which has only four square detector elements each forming a respective quadrant of the detector.

In contrast, when the detector 219 is being used to read information from the disk 10 of FIG. 1, the outputs of the four L-shaped detector elements A5, B5, C5 and D5 are all ignored, thereby creating a cross-shaped dead-band region between the other elements of the respective quadrants. Each of the detector elements A1–A4, B1–B4, C1–C4 and D1–D4 is individually active, and produces a respective separate output. The cross-shaped dead-band region ensures that where a portion of the radiation of a sub-beam falls outside the four detectors elements on which it is supposed to be directed, it impinges on the dead-band region rather than on a detector element of some other quadrant, thereby avoiding optical cross-talk between different quadrants that would effectively be optical noise.

With reference to FIG. 8, the optics system 218 focuses a beam of light from the laser diode 217 onto the surface 17 of the disk 10. Persons skilled in the art will recognize that the various beams of light discussed herein do not have a uniform intensity distribution across the beam, but instead have a non-uniform distribution such as a Gaussian distribution. However, for purposes of clarity in explaining the present invention, the light beams discussed herein are treated as if they have a well-defined area with a uniform intensity distribution within that area. When the laser beam directed onto the disk 10 by the optics system 218 is centered on a single ODE, for example as shown at 251 in FIG. 7, each of the four reflective surfaces of that ODE will produce a respective reflected sub-beam that travels in a respective direction determined by the orientation of that reflective surface.

The optics system 218 of FIG. 8 takes each of these four reflected sub-beams and images it onto a respective quadrant of the detector 219. In more detail, the reflected sub-beam from the category A reflective surface of the ODE is directed onto the portion of the detector 219 which includes the detector elements A1–A4 (as indicated diagrammatically at 256 in FIG. 9), the sub-beam reflected from the category B reflective surface is directed onto the portion of the detector 219 which includes the detector elements B1–B4 (as indicated diagrammatically at 257), the sub-beam reflected from the category C reflective surface is directed onto the portion of the detector 219 which includes the detector elements C1–C4 (as indicated diagrammatically at 258), and the sub-beam reflected from the category D reflective surfaces is directed onto the portion of the detector 219 which includes the detector elements D1–D4 (as indicated diagrammatically at 259).

In FIG. 9, it will be noted that the reflected sub-beam 256 is approximately centered within the square section of the detector 219 defined by the four detector elements A1–A4. This means that the corresponding category A reflective surface of the ODE has a tilt angle at approximately the center of the allowable range, or in other words about 11°, and has a rotation angle at approximately the center of the allowable range, or in other words about 45°. If the tilt angle was progressively increased, the reflected sub-beam 256 would move progressively further onto the detector element A1, whereas if the tilt angle was progressively decreased, the reflected sub-beam 256 would move progressively further onto the detector element A4. Thus, the between the respective amounts of illumination falling on the detector elements A1 and A4 is a factor which will be used to determine the tilt angle of the category A reflective surface of the ODE. The relative amounts of illumination falling on each of the detector elements A2 and A3 will also normally be taken into account in making this determination.

In a similar manner, if the rotation angle of the category A reflective surface is progressively increased or decreased, the reflected sub-beam 256 will tend to move progressively further onto the detector element A2 or progressively further onto the detector element A3. Thus, the difference between the respective amounts of illumination falling on the detector elements A2 and A3 is a significant factor in determining the rotation angle of the category A reflective surface. The amounts of illumination falling on the detector elements A1 and A4 will also be taken into account in determining the rotation angle. The orientations of the category B, C and D reflective surfaces of the ODE can be determined in a similar manner. Consequently, the four sub-beams reflected from the four reflective surfaces of a single ODE are all detected at the same time by the detector 219. As noted above, it requires 40 data elements on a standard compact disk or DVD disk to hold the same amount of information that can be stored in the four reflective surfaces of a single ODE of the disk 10. Each ODE of the disk 10 can be read as fast as an ODE of a standard compact disk or DVD disk. Therefore, the detector 219 can read information from the disk 10 approximately 40 times as fast as information can be read from a standard compact disk or a standard DVD disk.

Figure 10:
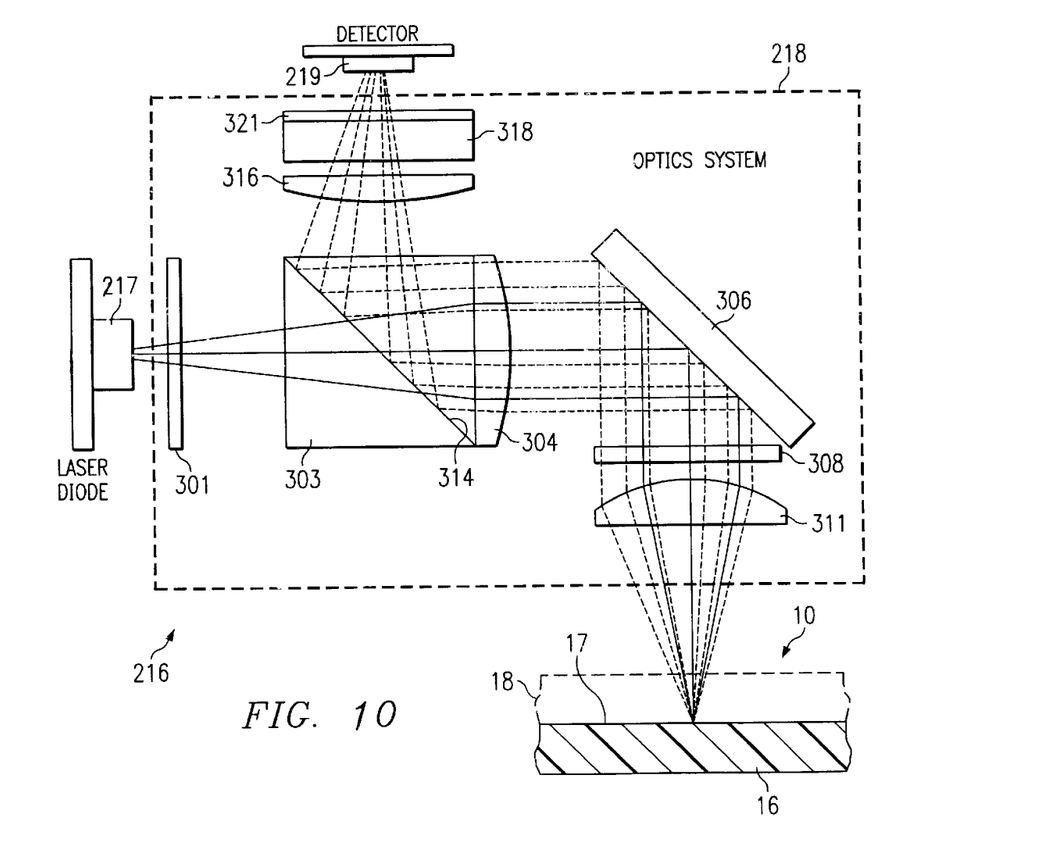
FIG. 10 is a diagrammatic view showing part of the disk of FIG. 1, and showing a laser diode, a detector and an optics system which are component's of the detection system of FIG. 8, the optics system being depicted in greater detail than in FIG. 8.

FIG. 10 is a diagrammatic view depicting the laser diode 217, the detector 219, part of the disk 10, and the optical components which make up the optics system 218. As shown in FIG. 10, light emitted by the laser diode 217 enters the optics system 218, and passes through a polarizer 301, a polarizing beam splitter 303, and a collector lens 304. The collector lens 310 collimates the light passing through it, after which this light is reflected by a fold or turning mirror 306, and then passes through a quarter wave plate 308 and an objective lens 311. The objective lens 311 focuses the light onto the surface 17 of the base layer 16 in the disk 10. As discussed above, this will result in several reflected sub-beams from different reflective surfaces of the surface 17 on the disk 10.

The various reflected sub-beams from the disk 10 pass through the lens 311, which collimates each sub-beam, and then the sub-beams pass through the quarter wave plate 308. Each sub-beam is then reflected by the fold mirror 306, and passes through the lens 304, which focuses the light passing through it. This focused radiation is then reflected by a surface 314 of the beam splitter 303, and passes successively through a cylindrical lens 316, a corrector plate 318, and a beam circularizing hologram 321 to the detector 219. The corrector plate 318 serves to enlarge the size of each sub-beam. At this point, the optics through which the sub-beams have passed will have caused each sub-beam to become somewhat elliptical in cross-sectional shape. The beam circularizing hologram, which may be refractive or diffractive, serves to make the cross-sectional shape of each sub-beam more circular and less elliptical.

Referring again to FIG. 8, the voice coil actuators 222 include a primary track-following actuator that can move the entire optical head 216 radially with respect to the disk 10 through the full radius of the information storage surface 17. The actuators 222 also include a secondary track-following actuator that can move the objective lens 311 through a very small displacement relative to other components of the optics system 218, in a direction approximately radially of the disk 10. The primary track-following actuator thus effects course radial positioning of the lens 311 by positioning the entire optical head 216, and the secondary track-following actuator effects precision positioning of the lens 311. The actuators 222 also include a third voice coil actuator, which can move the lens 311 toward and away from the disk 10 with respect to other optical components within the optical head 216, to thereby cause the radiation directed onto the disk 10 to have the proper focus at the surface 17. As mentioned earlier, all of the reflective surfaces on the disk 10 have their centerpoints located in a common imaginary plane. Therefore, equal areas of each reflective surface are above and below this focal plane, which facilitates proper focusing.

In the embodiment under discussion, the objective lens 311 has a numerical aperture of 0.7. As mentioned above, the maximum tilt angle for each reflective surface in the disclosed disk 10 is approximately 22°. The reason for this is that the largest angle of reflection which can be captured by the lens 311 having a numerical aperture of 0.7 is about 22°. However, through appropriate design, it would be possible to alternatively use a lens with a different numerical aperture, which would affect the maximum permissible value of the tilt angle for each reflective surface, and this in turn would affect the information storage capacity of the disk used in association with the detection system having that lens.

Referring back to FIG. 7, the broken line 351 represents a situation where the laser beam directed onto the disk 10 is not centered on a single track, but instead straddles two tracks, which in this case are the tracks having centerlines 122 and 123. It will be noted that the beam 351 strikes portions of four different reflective surfaces of category C, each of which will produce a reflected sub-beam directed onto the portion of the detector 219 (FIG. 9) that includes the detector elements C1–C4. Consequently, the amount of light directed onto this portion of the detector 219 will be two to three times greater than would be case if the laser beam was properly centered on a single ODE with a single surface from category C. In addition, at 351, the beam strikes portions of two reflective surfaces of category A, which will reflect some light onto the section of the detector that includes the detector elements A1–A4. On the other hand, the beam 351 does not illuminate any reflective surface of category B or category D, and thus the sections of the detector corresponding to categories B and D will each receive little or no illumination. In fact, it will be noted that, at any location where the beam is straddling these two tracks, there will be excessive illumination of detector quadrant A and/or C, and little or no illumination of detector quadrant B and/or D.

A similar situation is represented by broken line 352 in FIG. 7, which diagrammatically represent a laser beam that is straddling the two tracks having centerlines 123 and 124. Sub-beams are reflected from portions of four reflective surfaces of category B, two surfaces of category D and no surfaces of categories A and C. In fact, it will be noted that, at any location where the beam is straddling these two tracks, there will be excessive illumination of detector quadrant B and/or D, and little or no illumination of detector quadrant A and/or C. Due to this imbalance in the illumination of the different quadrants when the beam is off the center of the track in either direction, the outputs of the detector 219 can be used for servo tracking, to determine the direction in which the beam is off-center and to move the laser beam toward the centerline of one of the two tracks which it is straddling. This is discussed again later.

The broken line 353 in FIG. 7 represents an example of a laser beam which is centered on the track having centerline 123, but which is straddling two adjacent ODEs in that track. This laser beam will result in sub-beams reflected by two reflective surfaces in category D and two reflective surfaces in category C, but no reflective surfaces in either of categories A or B. Consequently, the portions of the detector 219 which include detector elements C1–C4 and detector elements D–D4 will each receive approximately twice the normal amount of illumination, whereas the portions which include detector elements A1–A4 and B1–B4 will receive little or no illumination. This particular imbalance condition in the illumination of the detector can be detected and used to generate a clock signal, as discussed later.

Broken line 354 identifies a further example of a laser beam which is straddling two adjacent ODEs within the track 123. In this case, the beam is reflected by two reflective surfaces of category A and two reflective surfaces of category B, but no reflective surfaces of categories C and D. This produces approximately twice the amount of normal illumination on the portions of the detector which include detector elements A1–A4 and detector elements B1–B4, and little or no illumination on the portions of the detector which include detector elements C1–C4 and D1–D4. It will thus be noted from 353 and 354 in FIG. 7 that, each time the laser beam moves from one ODE to the next ODE within a given track, the transition can be detected. Detection of these imbalances can be used to generate a clock signal synchronized to the movement of the beam along the ODEs in the track, in a manner described in more detail later. This synchronized clock signal can in turn help the detection circuitry determine when the laser beam is properly centered on a single ODE, for example as shown at 251 in FIG. 7, thereby facilitating reading of the detector at an appropriate point in time for each ODE.

Referring again to the block diagram in FIG. 8, the detector 219 has twenty analog output signals each corresponding to a respective one of the detector elements A1–A5, B1–B5, C1–C5 and D1–D5, and these output signals are all supplied to a respective current to voltage converter circuit, the twenty current to voltage converter circuits being collectively represented in FIG. 8 by a single block 401. The outputs of the twenty current to voltage converter circuits are each supplied to a respective radio frequency (RF) amplifier, the twenty RF amplifiers being collectively represented in FIG. 8 by a single block 402. The analog outputs of the twenty RF amplifiers are each supplied to a data clock signal analog summation circuit 406, which sums these analog signals so as to produce two signals, one of which is the sum of the signals from the eight detector elements A1–A4 and B1–B4, and the other of which is the sum of the signals from the eight detector elements C1–C4 and D1–D4. In FIG. 8, the first of these signals is identified with the label "A+B", and the second of these signals is identified with the label "C+D". It will be noted that these analog signals have respective peaks in situations corresponding to those respectively indicated at 354 and 353 in FIG. 7. These two signals are both supplied to a peak detect circuit 407, which uses them to generate a clock signal by detecting the absolute value of the difference, as follows:

$$\text{Data-Clock}_{peak} = |(A+B)-(C+D)| = |\{(A1+A2+A3+A4)+(B1+B2+B3+B4)\} - \{(C1+C2+C3+C4)+(D1+D2+D3+D4)\}|$$

The clock signal from the circuit 407 is supplied to a timing generator 408, which also receives an RF reference clock signal from a circuit 409. The timing generator 408 generates timing signals for time synchronous functions within the system, including motor speed control by the circuit 228, as well as sampling and analog-to-digital conversion. It is also this circuit element which extracts RLL encoded information as the ODE is being scanned under the optical stylus.

In this regard, the analog signals from the twenty RF amplifiers at 402 are supplied to twenty sample and hold circuits, which are represented collectively by a single block 416 in FIG. 8, and which each receive a timing signal from the timing generator circuit 408. The outputs of the twenty sample and hold circuits are supplied to an analog-to-digital converter circuit 417, which receives a timing signal from the timing generator 408, and which includes a single flash analog-to-digital converter circuit that successively converts each of the analog outputs from the twenty sample and hold circuits into a respective digital number. It would alternatively be possible to implement the analog-to-digital converter circuit 417 with several flash analog-to-digital converters, in order to simultaneously convert several analog signals from the circuit 416 into digital values, in order to increase the data throughput.

The twenty digital values from the converter circuit 417 are supplied to a detector output calibration offset and normalization circuit 421. This circuit puts appropriate sampled data into a random access memory (RAM) 422, which can also be accessed by a microprocessor 423. The microprocessor 423 executes a program stored in a read only memory (ROM) 424. It will be recognized that, if the disk 10 has a small and undesired degree of physical tilt in relation to the optics system 218, the various sub-beams reflected by the reflective surfaces on the disk will not have ideal orientations with respect to the optics system 218. A further consideration is that the reflectivity of the reflective surfaces may vary from disk to disk, for example where the disks are from different production lots or even different manufacturers.

The microprocessor 423 takes the information placed in the RAM 422 by the circuit 421, and calculates appropriate tilt correction factors, as well as laser power calibration offset and scaling factors. These calculated compensation values are then placed into a different portion of the RAM 422, where they can be accessed by the circuit 421. The circuit 421 then uses these compensation values to effect appropriate compensation and normalization of digital values from the converter circuit 417 which are passing through the circuit 421.

This compensated information from circuit 421 is then used by a circuit 431 to generate a laser control signal which is supplied to the laser driver circuit 226, and to generate focus and off-track control signals which are supplied through respective sections of a digital-to-analog converter circuit 432 to respective sections of the voltage to current converter circuit 227 that control the various actuators 222. In generating these signals, the circuit 421 effects appropriate servo loop compensation for mechanical and/or sampling artifacts of the system, such as resonances. With reference to the preceding discussion of the beams 351 and 352 in FIG. 7, the circuit 431 of the embodiment under discussion carries out the following calculation to generate the off-track signal, where a positive result indicates that the laser beam is off-track in one direction and a negative result indicates that the laser beam is off-track in the other direction:

Off-track=$(A+C)-(B+D)=\{(A1+A2+A3+A4)+(C1+C2+C3+C4)\}-\{(B1+B2+B3+B4)+(D1+D2+D3+D4)\}$ The digitized detector data is processed by a digital signal processor (DSP) circuit 436, in order to identify the digital state or value represented by the four reflective surfaces of the ODE which is presently being optically interrogated. This is carried out in the manner discussed above in association with FIG. 9, where the positions of the reflected sub-beams 256–259 on the various quadrants of the detector 219 are determined in order to identify the orientations of each of the four surfaces. In the embodiment under discussion, and as discussed above, the combined information from all four reflective surfaces yields a number representing 40 bits of binary data. Although this embodiment uses a DSP circuit 436 to maximize the throughput for the determination of this number from the outputs of the detector elements, alternative types of circuits could be used, such as a general purpose microprocessor.

The 40-bit binary number determined by the circuit 436 is passed to an error correction and control (ECC) circuit 437, which carries out an error detection and correction function on this number. In the embodiment under discussion, this error correction is carried out using a multi-layer Reed-Solomon product code, which is a known technique and is therefore not described in detail here.

If the error-corrected data is unsecure data, it is passed directly to a data buffer 441. Otherwise, if it is secure data, it is passed to a digital rights management (DRM) circuit 442. The DRM circuit 442 carries out appropriate DRM functions, such as decrypting the data using a media embedded factory key, and/or inserting into video or music content a unique digital signature or watermark tied to the media and/or the detection system. After the DRM circuit 442 has processed the data, it places the data in the buffer 441. The data buffer 441 holds the data until the microprocessor 423 is ready to transfer the data through the bus 233 to the not-illustrated host system.

The foregoing explanation of the detection system 210 in FIG. 8 was based on the assumption that the disk being read by the system is a disk 10 of the type shown in FIG. 1. However, the detection system 210 is also capable of reading a standard compact disk and/or DVD disk. In that case, and as discussed earlier, the circuit 421 sums the digital values for the detector elements A1–A5, sums the digital values for the detector elements B1–B5, sums the digital values for the detector elements C1–C5, and sums the digital values for the detector elements D1–D5, in order to obtain four digital values which each represent a respective quadrant of the detector 219. These four digital values are then processed by the various other portions of the integrated circuit 232 in a manner which is known in the art for existing devices that read data from a compact disk and/or a DVD disk.

Figure 11:
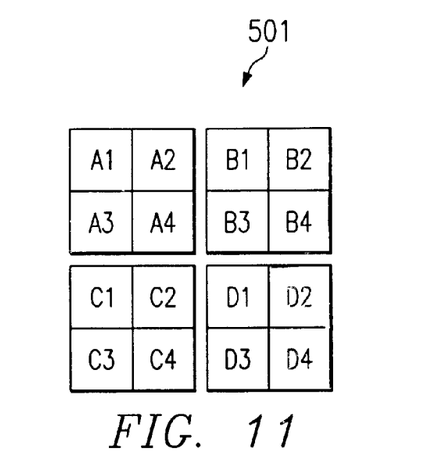
FIG. 11 is a diagrammatic view of a detector which is an alternative embodiment of the detector of FIG. 9.

FIG. 11 is a diagrammatic view of a detector 501 which is an alternative embodiment of the detector 219 of FIG. 9. The most significant difference is that the detector 501 does not include the four L-shaped detector elements A5, B5, C5, and D5 of FIG. 9. Aside from this, the detector 501 is similar in configuration and operation to the detector 219, and persons skilled in the art will recognize how the detector 501 could be incorporated into the system of FIG. 8 in place of the detector 219. In general, the outputs of the four detector elements of each quadrant are combined when the detector 501 is being used to read a standard compact disk or DVD disk, and are processed separately when the detector 501 is being used to read a disk of the type disclosed at 10 in the present application.

Figure 12:
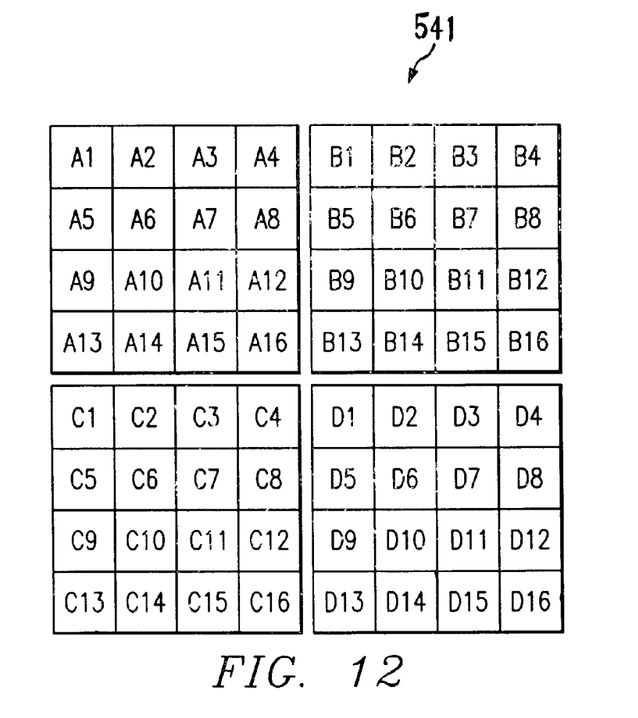
FIG. 12 is a diagrammatic view of a further detector which is still another alternative embodiment of the detector of FIG. 9.

FIG. 12 is a diagrammatic view of a detector 541 which is a further alternative embodiment of the detectors 219 and 501. The detector 541 is generally similar to the detector 501, except that each quadrant includes a 4×4 array of sixteen detector elements rather than a 2×2 array of four detector elements. Thus, while the upper left quadrant of the detector 501 has four elements A1–A4, the upper left quadrant of detector 514 has sixteen elements A1–A16. Aside from this, the detector 541 is similar in configuration and operation to the detector 501, and persons skilled in the art will recognize how the detector 541 could be incorporated into the system of FIG. 8 in place of the detector 219. In general, the outputs from the sixteen detector elements of each quadrant would be combined when the detector 541 is being used to read a standard compact disk or DVD disk, and would be processed separately when the detector 541 is being used to read a disk of the type disclosed at 10 in the present application.

The present invention provides a number of technical advantages. One such technical advantage relates to the provision of an optical disk which, in terms of information storage capacity per unit of surface area, can support a capacity which is approximately 20 to 100 times greater than that presently available in a standard compact disk or a standard DVD disk. A related advantage is that this increased storage capacity can be achieved with the use of only a single information-bearing surface, thereby avoiding the complexities involved in the use of multiple surfaces such as those in a standard dual-layer DVD disk.

A further related advantage is that the transfer rate of data from the disk to a detection system is approximately 20 to 100 times greater than the transfer rate available under comparable conditions with an existing compact disk or DVD disk. This in turn provides advantages such as the ability to run interactive software or games directly from an optical drive. Still another related advantage is that, despite the significantly greater storage capacity and transfer rates, a disk embodying the invention will have approximately the same cost as a pre-existing compact disk. The rate of data transfer for a disk embodying the invention exceeds the 30 MB per second rate at which existing computers commonly accept data from hard disk drives. Consequently, although the seek time for data on the disclosed optical disk may be slower than the seek rate of existing hard disk drives, and the first seek in a transfer will be visible, data buffering of the type disclosed herein will permit subsequent seeks in that transfer to be effectively masked for applications with a relatively small average read-back data block size. In contrast, existing DVD drives cannot transfer data as fast as a hard disk drive, and thus can never mask any of the seeks in a transfer.

A further advantage of the significantly increased storage capacity is that a full-length high definition television (HDTV) movie (20 GB) can be provided on a single small disk which is about 32 mm in diameter, or in other words about the size of a quarter. A disk of this size could be played back on a miniature personal video player which is approximately the size of a deck of cards.

Where a disk embodying the invention has the same standard size of 120 mm used for existing compact disks and DVD disks, it could hold a full set of summer movie releases from a given film studio, for example ten movies, along with associated digital rights management technology. This would enable the free distribution of the disk containing this content to consumers, while maintaining control over access to the information on the disk, much like Internet service providers effect mass mailings of compact disks. A recipient who wished to see one of the movies on the disk could pay a fee for a key which would allow access to that particular movie, but not other movies. In a different context, a full computer operating system and a full library of core software applications could be distributed and executed from a single 120 mm disk. Further, a single 120 mm disk could provide cost-effective distribution of a full-length digital-format movie to a movie theater equipped with a digital projector, with the capability to deliver the data to the projector at a rate sufficient to allow projection of the movie in real time.

Still another advantage results from the provision of a detection system which is capable of reading information from a disk that embodies the invention, as well as a standard compact disk and/or DVD disk. An aspect of this is the provision of a detector having multiple groups of detector elements, where the outputs of the detector elements are utilized independently to read a disk embodying the invention, but the outputs of the detector elements in each group are combined in order to read a standard compact disk or DVD disk. This detector may include some detector elements which are used in one mode but not another mode, such as the L-shaped detector elements provided in one of the disclosed embodiments.

Although selected embodiments have been illustrated and described in detail, it will be understood that various substitutions and alterations can be made therein without departing from the scope of the present invention. For example, each optical data element in the disclosed disk has four reflective surfaces, but it would alternatively be possible to use some other number or length of reflective surfaces within the same size region. Further, the disclosed disk stores information based on the orientation of the reflective surfaces. However, it would be possible for the reflective surfaces to vary other characteristics of the reflected energy, such as the cross-sectional size or shape of the reflected energy, and/or the distribution of energy within the cross-sectional shape. Further, it would be possible to store information optically in each optical data element in the form of an interference pattern or a hologram. Other substitutions and alterations are also possible without departing from the spirit and scope of the present invention, as defined by the following claims.

What is claimed is:

1. An apparatus, comprising:
   an information storage media having a plurality of reflective portions, each said reflective portion having a selected one of a plurality of predetermined orientations that are different, the number of said predetermined orientations being greater than two;
   wherein said predetermined orientations are allocated among a predetermined number of groups so that each said predetermined orientation belongs to only one of said groups, each said group containing more than two of said predetermined orientations; and
   wherein said information storage media includes a plurality of data elements which each include a plurality of said reflective portions equal in number to said predetermined number of groups, said reflective portions of each said data element having respective said orientations which each belong to a respective said group.

2. An apparatus according to claim 1, wherein said information storage media includes a plurality of track sections extending approximately parallel to each other, each of said track sections having a plurality of said data elements arranged in succession therealong.

3. An apparatus according to claim 2, wherein each said reflective portion is adjacent a further said reflective portion which is in the same said group, and which is in a different said data element disposed in the same said track section.

4. An apparatus according to claim 2, wherein each said reflective portion is adjacent a further said reflective portion which is in the same said group, and which is in a different said data element disposed in an adjacent track section.

5. An apparatus according to claim 4, wherein each said reflective portion is adjacent another said reflective portion which is in the same said group, and which is in a different said data element disposed in the same said track section.

6. An apparatus according to claim 1, including:
- a detector having a plurality of sections equal in number to the number of said reflective portions in each said data element, said sections of said detector each including a plurality of detector elements;
- an optical system which can direct onto said media a beam of radiation that can illuminate one of said data elements so that each of the reflective portions of that data element produces a respective reflected beam, said optical system directing each of said reflected beams onto a respective said section of said detector; and
- circuitry responsive to said detector elements of said detector for determining a position at which each of said reflected beams impinges on a respective said section of said detector to thereby determine the predetermined orientation of each said reflective portion of the data element illuminated by the beam.

7. An apparatus according to claim 6, including structure for effecting relative movement of said media and said optical system.

8. An apparatus, comprising:
- an information storage media having a plurality of reflective portions, each said reflective portion having a selected one of a plurality of predetermined orientations that are different, the number of said predetermined orientations being greater than two;
- wherein each of said reflective portions is an approximately planar surface portion; and
- wherein each of said predetermined orientations is defined by a first angle representing a tilt of the planar surface portion relative to a reference line and by a second angle representing a rotational orientation of the tilted planar surface portion about said reference line.

9. An apparatus according to claim 8,
- wherein said planar surface portions each have in approximately the center thereof a reference point; and
- wherein said reference points of all of said planar surface portions lie in a common plane.

10. An apparatus according to claim 9, wherein said reference line for each said surface portion extends through said reference point for that surface portion.

11. An apparatus, comprising an information storage media having a plurality of reflective portions, each said reflective portion being configured to impart to radiation reflected therefrom a selected one of a plurality of predetermined characteristics that are different, said predetermined characteristics being allocated among a predetermined number of groups so that each said predetermined characteristic belongs to only one of said groups, and so that each said group contains more than two of said predetermined characteristics, said information storage media including a plurality of data elements which each include a plurality of said reflective portions equal in number to said predetermined number of groups, said reflective portions of each said data element having respective said predetermined characteristics which each belong to a respective said group.

12. An apparatus according to claim 11, wherein said information storage media includes a track section having a plurality of said data elements arranged in succession therealong, each said reflective portion being adjacent a further said reflective portion which is in the same said group, and which is in a different said data element disposed in said track section.

13. An apparatus according to claim 11, wherein said information storage media includes a plurality of adjacent track sections which each have a plurality of said data elements arranged in succession therealong, each said reflective portion being adjacent a further said reflective portion which is in the same said group, and which is in a different said data element disposed in an adjacent said track section.

14. An apparatus according to claim 13, wherein each said reflective portion is adjacent another said reflective portion which is in the same said group, and which is in a different said data element disposed in the same said track section.

15. An apparatus according to claim 11, wherein each said reflective portion has a selected one of a plurality of predetermined orientations that are different, each said predetermined characteristic corresponding to a respective said predetermined orientation and being a respective different angle of reflection for radiation.

16. An apparatus according to claim 11, including:
- a detector having a plurality of sections equal in number to the number of said reflective portions in each said data element;
- an optical system which can direct onto said media a beam of radiation that can illuminate one of said data elements so that each of the reflective portions of that data element produces a respective reflected beam, said optical system directing each of said reflected beams onto a respective said section of said detector; and
- circuitry responsive to said sections of said detector for determining said predetermined characteristic of each said reflective portion of the data element illuminated by the beam.

17. An apparatus according to claim 16, including structure for effecting relative movement of said media and said optical system.

18. An apparatus, comprising:
- an information storage media having a plurality of reflective portions, each said reflective portion being configured to impart to radiation reflected therefrom a selected one of a plurality of predetermined characteristics that are different, said information storage media including a plurality of data elements which each include a predetermined number of said reflective portions;
- a detector having a plurality of sections equal in number to the number of said reflective portions in each said data element;
- an optical system which can direct onto said media a beam of radiation that can illuminate one of said data elements so that each of the reflective portions of that data element produces a respective reflected beam, said optical system directing each of said reflected beams from the illuminated data element onto a respective said section of said detector; and
- circuitry responsive to said sections of said detector for determining said predetermined characteristic of each said reflective portion of the data element illuminated by the beam.

19. An apparatus according to claim 18, wherein each said section of said detector includes a plurality of detector elements arranged in a two-dimensional array, said circuitry determining said predetermined characteristics as a function of signals from each of said detector elements of each said section.

20. An apparatus according to claim 18, wherein said data elements each have a size which is within a diffraction limited spot size of a focused beam of radiation having the same wavelength as said beam of radiation directed onto said media by said optical system.

21. An apparatus according to claim 18,
wherein said detector has four said sections which are arranged in a two dimensional array;
wherein each said section of said detector includes a first detector element which is L-shaped and has two legs disposed adjacent respective other said sections of said detector, and includes a plurality of second detector elements arranged in a two-dimensional array on an opposite side of said first detector element from other said sections of said detector; and
wherein when said circuitry is determining said predetermined characteristics said circuitry operates in an operational mode in which said circuitry ignores said first detector elements and is responsive to signals from each of said second detector elements of each said section of said detector.

22. An apparatus according to claim 21, wherein said circuitry has a further operational mode in which signals from all of said detector elements for each said section are combined to produce a single signal for each said section of said detector.

23. An apparatus according to claim 18, wherein said information storage media includes a plurality of track sections extending approximately parallel to each other, each of said track sections having a plurality of said data elements arranged in succession therealong.

24. A method, comprising the steps of:
providing an information storage media having a plurality of reflective portions;
configuring each said reflective portion to have a selected one of a plurality of predetermined orientations that are different, the number of said predetermined orientations being greater than two, and each said predetermined orientation representing respective different stored information;
allocating said predetermined orientations among a predetermined number of groups so that each said predetermined orientation belongs to only one of said groups, and each said group contains more than two of said predetermined orientations;
organizing said reflective portions as a plurality of data elements which each include a plurality of said reflective portions equal in number to said predetermined number of groups; and
configuring said reflective portions of each said data element to have respective said orientations which each belong to a respective said group.

25. A method according to claim 24, including the steps of:
illuminating one of said data elements so that each of the reflective portions of that data element produces a respective reflected beam;
directing each of said reflected beams onto a detector having a plurality of sections equal in number to the number of said reflective portions in each said data element, in a manner so that each of said reflected beams is directed onto a respective said section of said detector; and
determining a position at which each of said reflected beams impinges on a respective said section of said detector to thereby determine the predetermined orientations of each of said reflective portions of the data element illuminated by the beam.

26. A method comprising the steps of:
providing an information storage media having a plurality of reflective portions;
configuring each said reflective portion to impart to radiation reflected therefrom a selected one of a plurality of predetermined characteristics that are different and that each represent different stored information;
allocating said predetermined characteristics among a predetermined number of groups so that each said predetermined characteristic belongs to only one of said groups, and so that each said group contains more than two of said predetermined characteristics;
organizing said reflective portions as a plurality of data elements which each include a plurality of said reflective portions equal in number to said predetermined number of groups; and
configuring said reflective portions of each said data element to have respective said predetermined characteristics which each belong to a respective said group.

27. A method according to claim 26, including the step of selecting for each said reflective portion one of a plurality of predetermined orientations that are different, each said predetermined characteristic corresponding to a respective said predetermined orientation and being a respective different angle of reflection for radiation.

28. A method according to claim 26, including the steps of:
directing a beam of radiation onto one of said data elements so that each of the reflective portions of that data element produces a respective reflected beam;
directing each of said reflected beams onto a detector having a plurality of sections equal in number to the number of said reflective portions in each said data element, in a manner so that each said reflected beam is directed onto a respective said section of said detector; and
determining said predetermined characteristic of each said reflective portion of the data element illuminated by the beam in response to outputs from said sections of said detector.

29. A method, comprising the steps of:
providing an information storage media having a plurality of reflective portions;
configuring each said reflective portion to impart to radiation reflected therefrom a selected one of a plurality of predetermined characteristics that are different;
organizing said reflective portions as a plurality of data elements which each include a predetermined number of said reflective portions;
directing a beam of radiation onto one of said data elements so that each of the reflective portions of that data element produces a respective reflected beam;
directing each of said reflected beams from the illuminated data element onto a detector having a plurality of sections equal in number to the number of said reflective portions in each said data element, in a manner so that each said reflected beam is directed onto a respective said section of said detector; and
determining said predetermined characteristic of each said reflective portion of the data element illuminated by the beam in response to outputs from said sections of said detector.

30. A method according to claim 29,
including the step of configuring said detector so that each said section thereof includes a plurality of detector elements arranged in a two-dimensional array; and
wherein said step of determining said predetermined characteristics is carried out as a function of signals from each of said detector elements of each said section.

31. An apparatus comprising an information storage media having a plurality of portions that each have a respective topography which is a selected one of a plurality of three-dimensional reflective topographies and which is responsive to radiation of a selected wavelength for producing a reflected beam that travels away from said media and that has a characteristic determined by the topography of that portion, each said characteristic being one of a plurality of predetermined states and the number of said predetermined states being greater than two.

32. An apparatus according to claim 31,
wherein said portions each have a dimension which is less than the selected wavelength; and
wherein adjacent said portions are positioned so that they are closer to each other than a distance equal to the selected wavelength.

33. An apparatus according to claim 31, wherein a subset of said portions contains at least one said portion, is disposed within a region having an area less than approximately 2.56 $\mu m^2$, and stores information corresponding to at least 17 bits.

34. An apparatus according to claim 33, wherein said subset stores information corresponding to approximately 40 bits.

35. An apparatus according to claim 31, wherein said number of said predetermined states is substantially greater than two.

36. An apparatus according to claim 35, wherein said number of said predetermined states is approximately 885.

37. An apparatus according to claim 31, wherein said characteristic is a direction of travel, and each of said states is a respective different direction of travel.

38. An apparatus according to claim 31, including an optical system which can direct onto said media through a lens a beam of radiation having approximately said selected wavelength, said optical system being configured so that said lens is the last lens through which said beam of radiation passes before impinging on said media, and so that said reflected beam passes through said lens and said lens is the first lens through which said reflected beam passes after departing said media.

39. An apparatus comprising an information storage media having a plurality of information storage portions which are configured to have a beam of radiation with a selected wavelength impinge thereon, and which each include a plurality of reflective portions, said reflective portions each having a dimension which is less than the selected wavelength, and adjacent said reflective portions in each said information storage portion being positioned so that they are closer to each other than a distance equal to the selected wavelength.

40. An apparatus according to claim 39, wherein each said information storage portion is disposed within a region having an area less than approximately 2.56 $\mu m^2$, and stores information corresponding to at least 17 bits.

41. An apparatus according to claim 40, wherein each said information storage portion stores information corresponding to approximately 40 bits.

42. An apparatus comprising an information storage media having a plurality of information storage portions which are reflective to radiation of a selected wavelength, said storage media storing information corresponding to at least 17 bits in at least one said information storage portion disposed within a region having an area less than approximately 2.56 $\mu m^2$.

43. An apparatus according to claim 42, wherein said information stored in said region corresponds to approximately 40 bits.

44. A method comprising:
providing an information storage media having a plurality of portions that each have a respective topography which is a selected one of a plurality of three-dimensional reflective topographies; and
configuring each said portion to be responsive to radiation of a selected wavelength for producing a reflected beam that travels away from said media and that has a characteristic determined by the topography of that portion, each said characteristic being one of a plurality of predetermined states and the number of said predetermined states being greater than two.

45. A method according to claim 44, including:
configuring each of said portions to have a dimension which is less than the selected wavelength; and
positioning adjacent said portions so that they are closer to each other than a distance equal to the selected wavelength.

46. A method according to claim 44, including:
selecting a subset of said portions which contains at least one said portion and which is disposed within a region having an area less than approximately 2.56 $\mu m^2$; and
storing information in said subset which corresponds to at least 17 bits.

47. A method according to claim 46, wherein said storing is carried out so that said information stored in said subset corresponds to approximately 40 bits.

48. A method according to claim 44, including selecting said number of said predetermined states to be substantially greater than two.

49. A method according to claim 48, wherein said selecting of said number of said predetermined states is carried out so that said number of said predetermined states is approximately 885.

50. A method according to claim 44, including selecting said characteristic to be a direction of travel, each of said states being a respective different direction of travel.

51. A method according to claim 44,
including providing an optical system which can direct onto said media through a lens a beam of radiation having approximately said selected wavelength; and
configuring said optical system so that said lens is the last lens through which said beam of radiation passes before impinging on said media, so that said reflected beam passes through said lens, and so that said lens is the first lens through which said reflected beam passes after departing said media.

52. A method comprising:
providing an information storage media having a plurality of information storage portions which are configured to have a beam of radiation with a selected wavelength impinge thereon, and which each include a plurality of reflective portions;
configuring each of said reflective portions to have a dimension which is less than the selected wavelength; and
positioning adjacent said reflective portions in each said information storage portion so that they are closer to each other than a distance equal to the selected wavelength.

53. A method according to claim 52, including:
configuring each said information storage portion to be disposed within a region having an area less than approximately 2.56 $\mu m^2$; and storing information in each said information storage portion which corresponds to at least 17 bits.

54. A method according to claim 53, wherein said storing is carried out so that said information stored in each said information storage portion corresponds to approximately 40 bits.

55. A method comprising:

providing an information storage media having a plurality of information storage portions which are reflective to radiation of a selected wavelength; and storing information corresponding to at least 17 bits in at least one said information storage portion disposed within a region having an area less than approximately 2.56 $\mu m^2$.

56. A method according to claim 55, wherein said storing is carried out so that said information stored in said at least one information storage portion corresponds to approximately 40 bits.

* * * * *